United States Patent
Tode et al.

(10) Patent No.: US 8,343,662 B2
(45) Date of Patent: Jan. 1, 2013

(54) NONAQUEOUS ELECTROLYTE SECONDARY BATTERY

(75) Inventors: Shingo Tode, Kobe (JP); Akira Kinoshita, Kobe (JP); Hiroyuki Fujimoto, Kobe (JP); Yasufumi Takahashi, Kobe (JP); Ikuro Nakane, Kobe (JP); Shin Fujitani, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 1036 days.

(21) Appl. No.: 10/566,655

(22) PCT Filed: Aug. 5, 2004

(86) PCT No.: PCT/JP2004/011246
§ 371 (c)(1),
(2), (4) Date: Feb. 1, 2006

(87) PCT Pub. No.: WO2005/015663
PCT Pub. Date: Feb. 17, 2005

(65) Prior Publication Data
US 2006/0177737 A1      Aug. 10, 2006

(30) Foreign Application Priority Data

Aug. 8, 2003  (JP) .................................. 2003-206878

(51) Int. Cl.
*H01M 4/13* (2010.01)
*H01M 4/50* (2010.01)

(52) U.S. Cl. ....................... 429/231.1; 429/223; 429/224

(58) Field of Classification Search ................ 429/231.1, 429/223–224
See application file for complete search history.

(56) References Cited

U.S. PATENT DOCUMENTS

| | | | |
|---|---|---|---|
| 6,361,756 B1 | 3/2002 | Gao et al. | 423/599 |
| 2001/0018149 A1* | 8/2001 | Yageta et al. | 429/224 |
| 2002/0012830 A1* | 1/2002 | Uemura et al. | 429/60 |
| 2003/0180620 A1* | 9/2003 | Nakane et al. | 429/231.95 |
| 2004/0126660 A1* | 7/2004 | Ohzuku et al. | 429/223 |

FOREIGN PATENT DOCUMENTS

| | | |
|---|---|---|
| JP | 2561556 B2 | 9/1996 |
| JP | 2855877 B2 | 11/1998 |
| JP | 3244314 B2 | 10/2001 |
| JP | 2002-42813 A | 2/2002 |
| JP | 2002-042893 A | 2/2002 |
| JP | 2002-208401 A | 7/2002 |
| JP | 2003-31219 A | 1/2003 |

(Continued)

OTHER PUBLICATIONS

Yoshio, Masaki et al., "Preparation and properties of $LiCo_yMn_xNi_{1-x-y}O_2$ as a cathode for lithium ion batteries", *Journal of Power Sciences*, 90 (2000), pp. 176-181.

(Continued)

*Primary Examiner* — Karie O'Neill Apicella
(74) *Attorney, Agent, or Firm* — McDermott Will & Emery LLP (57) ABSTRACT

A nonaqueous electrolyte secondary battery in which a lithium transition metal complex oxide containing at least Ni and Mn as transition metals and having a layered structure is used as a positive active material, the lithium transition metal complex oxide containing at least Ni and Mn as transition metals and having a layered structure further containing zirconium.

9 Claims, 3 Drawing Sheets

FOREIGN PATENT DOCUMENTS

| | | | |
|---|---|---|---|
| JP | 2003031219 A | * | 1/2003 |
| JP | 2004-6229 A | | 1/2004 |
| JP | 2004-161526 A | | 6/2004 |
| JP | 2004-273168 A | | 9/2004 |
| JP | 2004-311408 A | | 11/2004 |

OTHER PUBLICATIONS

Lu, Zhonghua et al., "Layered Li[Ni$_x$Co$_{1-2x}$Mn$_x$]O$_2$ Cathode Materials for Lithium-Ion Batteries", *Electrochemical and Solid-State Letters*, 4 (12) pp. A200-A203, 2001.

Ohzuku, Tsutomu et al., "Layered Lithium Insertion Manual of LiCo$_{1/3}$Ni$_{1/3}$Mn$_{1/3}$O$_2$ for Lithium-Ion Batteries", *Chemistry Letters*, 2001, pp. 642-643.

J.-S. Kim et al., "Layered xLiMO$_{2'(1-x)Li2}$M'O$_3$ electrodes for lithium batteries: a study of 0.95 LiMn$_{0.5}$Ni$_{0.5}$O$_2$•0.05Li$_2$TiO$_3$", Electrochemistry Communications 4 (2002) pp. 205-209.

Questioning mailed Nov. 8, 2011, in Japanese patent application No. 2003-206878, and English translation thereof.

* cited by examiner

NONAQUEOUS ELECTROLYTE SECONDARY BATTERY

This application is a 371 of international application PCT/JP2004/011246 filed Aug. 5, 2004, which claims priority based on Japanese patent application No. 2003-206878 filed Aug. 8, 2003, the entire contents of each of which is hereby incorporated by reference.

TECHNICAL FIELD

The present invention relates to a nonaqueous electrolyte secondary battery.

BACKGROUND ART

In recent years, nonaqueous electrolyte secondary batteries using metallic lithium, an alloy capable of storing and releasing lithium or a carbon material as the negative active material and a lithium transition metal complex oxide represented by the chemical formula: $LiMO_2$ (M indicates a transition metal) as the positive active material have been noted as high-energy-density batteries.

A representing example of the lithium transition metal complex oxide is lithium cobaltate ($LiCoO_2$), which has been already put to practical use as the positive active material for nonaqueous electrolyte secondary batteries.

However, other lithium transition metal complex oxides containing Mn or Ni as a transition metal, as well as those containing all of Mn, Ni and Co, have been also studied (for example, Patent Literatures 1 and 2 and Non-Patent literature 1).

Among those lithium transition metal complex oxides containing Mn, Ni and Co, the material having the same composition of Mn and Ni and represented by a chemical formula: $LiMn_xNi_xCo_{(1-2x)}O_2$ is reported as showing a uniquely high thermal stability even in a charged state (high oxidation state) (for example, Non-Patent Literature 2).

It is also reported that the complex oxide having substantially the same composition of Ni and Mn has a voltage of approximately 4 V, as comparable to that of $LiCoO_2$, and shows a high capacity and a superior charge-discharge efficiency (Patent Literature 3).

Batteries using a positive electrode containing, as a chief material (at least 50% by weight), such a lithium transition metal complex oxide containing Mn, Ni and Co and having a layered structure (for example, chemical formula: $Li_aMn_b$-$Ni_bCo_{(1-2b)}O_2$ ($0 \leq a \leq 1.2$, $0 < b \leq 0.5$)), because of their high thermal stability during charge, can be expected to achieve a marked reliability improvement. Also, it is reported (Non-Patent Literature 3) that this lithium transition metal complex oxide containing Mn, Ni and Co and having a layered structure, because of its high structural stability, exhibits better cycle characteristics than currently-used $LiCoO_2$ or others, even when its charge voltage is set at a higher value (positive electrode potential of at least 4.5 V (vs. Li/Li$^+$)) than values used in the current state of the art.

In existing nonaqueous electrolyte secondary batteries using a lithium transition metal complex oxide (for example, $LiCoO_2$) for the positive electrode, an end-of-charge voltage is generally prescribed at 4.1-4.2 V. In this case, the positive electrode utilizes only 50-60% of its theoretical capacity. Therefore, the use of a lithium transition metal complex oxide having a layered structure enables the positive electrode to utilize at least 70% of its theoretical capacity and thus enables the battery to increase its capacity and energy density without marked deterioration of thermal stability even when a charge voltage is set at a high value.

Patent Literature 1: U.S. Pat. No. 2,561,556
Patent Literature 2: U.S. Pat. No. 3,244,314
Patent Literature 3: Patent Laying-Open No. 2002-42,813
Patent Literature 4: U.S. Pat. No. 2,855,877
Non-Patent Literature 1: Journal of Power Sources, 90(2000), 176-181
Non-Patent Literature 2: Electrochemical and Solid-State Letters, 4(12), A200-A200-A203 (2001)
Non-Patent Literature 3: Chemistry Letters, 2001, pp 642-643

DISCLOSURE OF THE INVENTION

However, nonaqueous electrolyte secondary batteries, even if using the lithium transition metal complex oxide containing Mn, Ni and Co and having a layered structure as the positive active material, still show the declining discharge voltage and discharge capacity with charge-discharge cycling. Particularly in a charged state at such a high potential that a positive electrode has a charge voltage of at least 4.5 V (vs. Li/Li$^+$), such batteries exhibit marked loss in discharge voltage and discharge capacity after charge-discharge cycles. The resulting energy density loss has been a problem. That is, a problem in cycle characteristics has been encountered in such batteries, particularly those which have a positive electrode potential of at least 4.5 V (vs. Li/Li$^+$) in a fully charge state (e.g., those which have a charge voltage of at least 4.4 V when using a carbon negative electrode having a charge potential of 0.1 V (vs. Li/Li$^+$)).

It is an object of the present invention to provide a nonaqueous electrolyte secondary battery which uses a positive electrode containing, as a positive active material, a lithium transition metal complex oxide containing at least Ni and Mn as transition metals and having a layered structure and which can suppress declining of discharge voltage and capacity during charge-discharge cycles and improve cycle characteristics.

The nonaqueous electrolyte secondary battery of the present invention includes a positive electrode containing a positive active material, a negative electrode containing a negative active material and a nonaqueous electrolyte. Characteristically, the positive active material comprises a lithium transition metal complex oxide containing at least Ni and Mn as transition metals and further containing zirconium.

In the present invention, inclusion of zirconium in the lithium transition metal complex oxide suppresses declining of discharge voltage and capacity with charge-discharge cycling. Although the details of this cause are not clarified, the following has been found as a result of analysis of the positive and negative electrodes after charge-discharge cycles, which will be hereinafter described.

(1) In case of a lithium transition metal complex oxide excluding zirconium (Zr), its XRD patterns both before and after cycles show no appreciable difference.

(2) Measurement of the amount of manganese precipitated (or deposited) on a surface of a negative electrode after charge-discharge cycles reveals that a battery using a lithium transition metal complex oxide excluding zirconium (Zr) as a positive active material contains a larger amount of manganese precipitated (deposited) on the surface of negative electrode, compared to the battery of the present invention which uses a lithium transition metal complex oxide containing zirconium (Zr).

It is believed from the forgoing that the declining characteristics of the battery using the zirconium-excluding lithium transition metal complex oxide as a positive active material with charge-discharge cycles is not due to structural degradation of the positive active material but due to elution of manganese from a surface of the positive active material. This probably causes a resistance build-up at a positive electrode-electrolyte solution interface to result in loss of discharge voltage and discharge capacity. The use of the zirconium-containing lithium transition metal complex oxide as the positive active material, in accordance with the present invention, is therefore believed to restrain dissolution of manganese from a surface of the positive active material and, as a result, retard a resistance build-up at the positive electrode-electrolyte interface and suppress declining of a discharge voltage and a discharge capacity.

Although the effect of the zirconium addition on charge-discharge cycle characteristics is confirmed even in a charged state at a positive electrode potential of 4.3 V (vs. Li/Li$^+$), its effect, particularly, to suppress decline of a discharge potential becomes more significant when in a charged state at a high potential of at least 4.5 V (vs. Li/Li$^+$).

Patent Literature 4 proposes addition of zirconium to LiCoO$_2$. However, as it describes in paragraph [0008], its action/effect is to prevent decomposition of an electrolyte solution and structural degradation of active material by coating LiCoO$_2$ particle surfaces with zirconium oxide or a lithium zirconium complex oxide so that they are stabilized, and is therefore believed to be completely different from the action/effect of the present invention.

In the present invention, the amount of zirconium contained in the positive active material is preferably from 0.1 mole % to 5 mole %, based on the total amount of transition metals in the lithium transition metal complex oxide. If the zirconium content is excessively small, a cycle characteristics improving effect of the present invention may not be obtained sufficiently. On the other hand, if the zirconium content is excessively large, discharge characteristics of the positive electrode may be adversely affected.

The negative active material for use in the present invention is not particularly specified in type, so long as it can be used in nonaqueous electrolyte secondary batteries. Examples of useful materials include carbon materials such as graphite, lithium-alloying materials such as silicon, aluminum and tin, and lithium titanates. In an exemplary case where a carbon material is used as the negative active material that provides a discharge potential of 0.1 V (vs. Li/Li$^+$) at the negative electrode, if the positive electrode in a fully charged state has a potential of 4.5 V (vs. Li/Li$^+$) or above, then an end-of-charge voltage is at least 4.4V. This secondary battery is a nonaqueous electrolyte secondary battery according to a limited aspect of the present invention.

That is, the nonaqueous electrolyte secondary battery according to a limited aspect of the present invention includes a positive electrode containing a positive active material, a negative electrode containing a carbon material as a negative active material and a nonaqueous electrolyte, and is designed to be charged with an end-of-charge voltage of at least 4.4 V. Characteristically, the positive active material comprises a lithium transition metal complex oxide containing at least Ni and Mn as transition metals and having a layered structure and further contains zirconium.

In the present invention, a ratio in capacity of the negative to positive electrode (negative electrode/positive electrode) in their portions opposed to each other is preferably designed to fall within the range of 1.0-1.3. If this capacity ratio falls below 1.0, metallic lithium may precipitate on a surface of the negative electrode to thereby deteriorate cycle characteristics and lower a safety level of the battery in a remarkable manner. On the other hand, if the capacity ratio exceeds 1.3, an excess part of the negative electrode that does not take part in a reaction enlarges to lower an energy density of the battery.

In the present invention, the positive electrode in a charged state preferably has a potential of at least 4.5 V (vs. Li/Li$^+$), as described above. More preferably, the positive electrode in a charged state preferably has a potential of 4.5-5.2 V (vs. Li/Li$^+$). If the positive electrode is charged to a potential range that exceeds 5.2 V (vs. Li/Li$^+$), decomposition of the electrolyte solution on an electrode surface in some cases becomes more significant than extraction of lithium in the active material, which is not preferred.

In the present invention, the lithium transition metal complex oxide for incorporation of zirconium is preferably represented by a chemical formula: Li$_a$Mn$_x$Ni$_y$Co$_z$O$_2$ (a, x, y and z satisfy 0≦a≦1.2, x+y+z=1, 0<x≦0.5, 0<y≦0.5 and z≧0).

Also in the present invention, the lithium transition metal complex oxide preferably contains substantially the same amount by mole of Ni and Mn. By substantially the same amount by mole, it is meant that x, y and z satisfy the following equations:

$$0.45 \leq x/(x+y) \leq 0.55$$

$$0.45 \leq y/(x+y) \leq 0.55$$

Nickel, in its nature, is high in capacity but low in thermal stability during charge, while manganese, in its nature, is low in capacity but high in thermal stability during charge. Therefore, if these two elements are contained substantially in the same amount by mole, those characteristics can be well balanced.

In the present invention, the positive active material preferably has a specific surface area in the range of 0.1-2.0 m$^2$/g. Within the specified range, the positive active material at a high potential can be restrained from reacting with the electrolyte solution.

In the present invention, the positive electrode may contain an electroconductor. In the case where a carbon material is used as the electro conductor, it is preferably contained in the amount of not greater than 5%, based on the total weight of the positive active material, electroconductor and binder. If a potential of the positive electrode goes high, the electrolyte solution is most likely to undergo oxidative decomposition on a surface of the carbon material as the electroconductor. Therefore, the loading of the carbon material as the electroconductor is preferably within the above-specified range.

A nonaqueous electrolyte solvent for use in the present invention can be selected from those conventionally used as electrolyte solvents for nonaqueous electrolyte secondary batteries. Particularly preferred among them is a mixed solvent of a cyclic carbonate and a chain carbonate. Examples of cyclic carbonates include ethylene carbonate, propylene carbonate, butylene carbonate and vinylene carbonate. Examples of chain carbonates include dimethyl carbonate, methyl ethyl carbonate and diethyl carbonate.

Cyclic carbonates are generally susceptible to decomposition at a high potential. Therefore, the cyclic carbonate content of the solvent is preferably within the range of 10-50% by volume, more preferably within the range of 10-30% by volume.

A nonaqueous electrolyte solute useful in the present invention can be selected from lithium salts generally used as a solute for nonaqueous electrolyte secondary batteries. Example of such lithium salts include LiPF$_6$, LiBF$_4$, LiCF$_3$SO$_3$, LiN(CF$_3$SO$_2$)$_2$, LiN(C$_2$F$_5$SO$_2$) 2, LiN(CF$_3$SO$_2$)(C$_4$F$_9$SO$_2$), LiC(CF$_3$SO$_2$)$_3$, LiC (C$_2$F$_5$SO$_2$) 3, LiAsF$_6$, LiClO$_4$, Li$_2$B$_{10}$Cl$_{10}$, Li$_2$B$_{12}$Cl$_{12}$ and mixtures thereof. LiPF$_6$ (lithium hexafluorophosphate), among them, is preferably used. Charging at a higher voltage increases a tendency of aluminum, which is a positive current collector, to dissolve. However, LiPF$_6$, if present, decomposes to form on an aluminum surface a film which restrains dissolution of aluminum. Therefore, the use of $LiPF_6$ as the lithium salt is preferred.

The nonaqueous electrolyte secondary battery using a lithium transition metal complex oxide containing at least Ni and Mn as transition metals and having a layered structure, in accordance with the present invention, can suppress declining of discharge voltage and capacity with charge-discharge cycling and accordingly improve cycle characteristics. The remarkable characteristic improving effect is obtained when the positive electrode in a fully charged state has a potential of at least 4.5 V (vs. $Li/Li^+$).

EXPLANATION OF REFERENCE NUMERALS

1 . . . working electrode
2 . . . counter electrode
3 . . . reference electrode
4 . . . electrolyte solution

BEST MODE FOR CARRYING OUT THE INVENTION

The present invention is below described in more detail by way of Examples. It will be recognized that the following examples merely illustrate the present invention and are not intended to be limiting thereof. Suitable changes can be effected without departing from the scope of the present invention.

EXPERIMENT 1

Example 1

[Preparation of Positive Active Material]

LiOH and a coprecipitated hydroxide represented by $Mn_{0.33}Ni_{0.33}Co_{0.34}(OH)_2$ were mixed in an Ishikawa automated mortar such that a ratio in mole of Li to all transition metals was brought to 1:1. Then, zirconium (IV) oxide was added so that a ratio in mole of zirconium to all transition metals in $LiMn_{0.33}Ni_{0.33}Co_{0.34}O_2$ was brought to 0.5%. The resulting mixture was heat treated in the air atmosphere at 1,000° C. for 20 hours and then pulverized to obtain a positive active material which contained a lithium transition metal complex oxide represented by $LiMn_{0.33}Ni_{0.33}Co_{0.34}O_2$ and having a mean particle diameter of about 10 μm and also contained zirconium. A BET specific surface area of the obtained positive active material was 0.67 $m^2/g$.

[Fabrication of Working Electrode]

The above-prepared positive active material, carbon as an electrical conductor and polyvinylidene fluoride as a binder at a ratio by weight of 90:5:5, were added to N-methyl-2-pyrrolidone as a dispersing medium. The mixture was kneaded to prepare a cathode mix slurry. The prepared slurry was coated on an aluminum foil as a current collector, dried and then rolled by a pressure roll. Subsequent attachment of a current collecting tab completed fabrication of a working electrode.

[Preparation of Electrolyte Solution]

Ethylene carbonate (EC) and ethyl methyl carbonate (EMC) were mixed at a 3:7 ratio by volume to provide a solvent in which lithium hexafluorophosphate ($LiPF_6$) was subsequently dissolved in the concentration of 1 mole/liter to prepare an electrolyte solution.

[Construction of Three-Electrode Beaker Cell]

Figure 6:
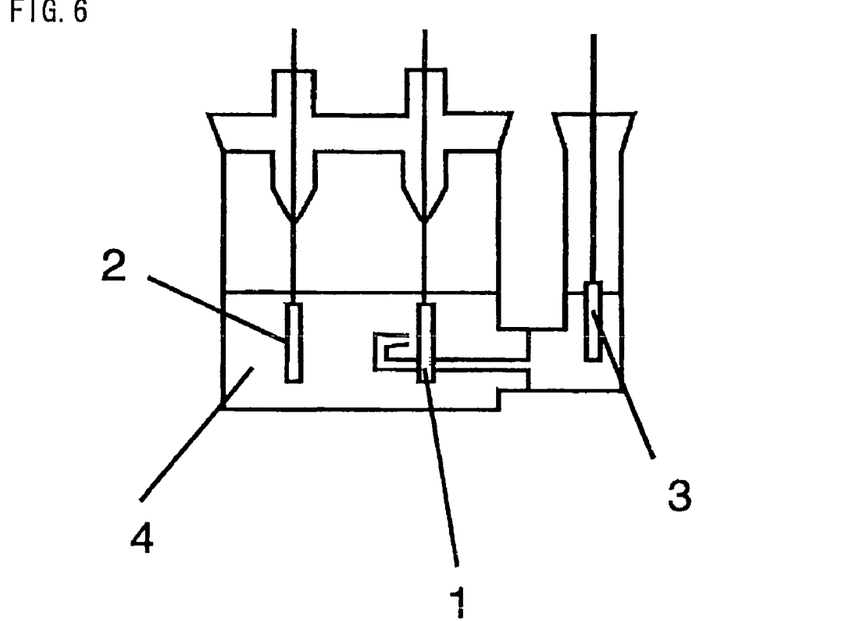
FIG. 6 is a schematic view showing a construction of a three-electrode beaker cell.

The three-electrode beaker cell shown in FIG. 6 was constructed in a glove box maintained under argon atmosphere. The beaker contains the electrolyte solution 4 in which the working electrode 1, counter electrode 2 and reference electrode 3 were immersed. Metallic lithium was used for the counter electrode 2 and reference electrode 3.

[Evaluation of Initial Charge-Discharge Characteristics]

The above-fabricated three-electrode beaker cell at room temperature was charged at a constant current of 0.75 $mA/cm^2$ (about 0.3C) until a working electrode potential reached 4.3 V (vs. $Li/Li^+$), further charged at a constant current of 0.25 $mA/cm^2$ (about 0.1C) until the potential reached 4.3V (vs. $Li/Li^+$) and then discharged at a constant current of 0.75 $mA/cm^2$ (about 0.3C) until the potential reached 2.75V (vs. $Li/Li^+$) to evaluate initial charge-discharge characteristics.

[Evaluation of Charge-Discharge Cycle Characteristics]

The above evaluation of initial charge-discharge cycle characteristics was followed by 15 cycles of charge and discharge at room temperature under the same conditions and then a capacity retention on the 16th-cycle was calculated from the following equation. Also, discharge curves for the 1st-cycle and 16th-cycle were compared to determine a decline in potential when discharge was initiated.

Capacity retention (%)=(16th-cycle discharge capacity)÷(1st-cycle discharge capacity)×100

Example 2

In Preparation of Positive Active Material, zirconium oxide was added so that a ratio in mole of zirconium to all transition metals in the lithium transition metal complex oxide was brought to 1.0%. Otherwise, the procedure of Example 1 was followed to construct a three-electrode beaker cell. A BET specific surface area of the obtained positive active material was 0.64 $m^2/g$. Its initial charge-discharge characteristics and charge-discharge cycle characteristics were evaluated in the same manner as in Example 1.

Example 3

The procedure of Example 1 was followed to construct a three-electrode beaker cell. Then, the procedure of Example 1 was followed, except that the prescribed charge potential of the working electrode was 4.6 V (vs. Li/Li+), to evaluate initial charge-discharge characteristics and charge-discharge cycle characteristics.

Example 4

The procedure of Example 2 was followed to construct a three-electrode beaker cell. Then, the procedure of Example 1 was followed, except that the prescribed charge potential of the working electrode was 4.6 V (vs. Li/Li+), to evaluate initial charge-discharge characteristics and charge-discharge cycle characteristics.

Comparartive Example 1

In Preparation of Positive Active Material, LiOH and the coprecipitated hydroxide represented by $Mn_{0.33}Ni_{0.33}Co_{0.34}(OH)_2$ were mixed in an Ishikawa automated mortar such that a ratio in mole of Li to all transition metals was brought to 1:1, and this mixture alone was heat treated. Otherwise, the procedure of Example 1 was followed to construct a three-electrode beaker cell and evaluate initial charge-discharge characteristics and charge-discharge cycle characteristics.

Comparative Example 2

The procedure of Comparative Example 1 was followed to construct a three-electrode beaker cell. Then, the procedure of Example 1 was followed, except that the prescribed charge potential of the working electrode was 4.6 V (vs. Li/Li+), to evaluate initial charge-discharge characteristics and charge-discharge cycle characteristics.

The evaluation results for the above Examples 1-4 (beaker cells A1-A4) and Comparative Examples 1 and 2 (beaker cells X1 and X2) are shown in Tables 1 and 2. In Table 1, the BET specific surface area of the positive active material used is also shown.

TABLE 1

| | Cell | Zr Content (Mole %) of Active Material | End-of-Charge Voltage (V(vs. Li/Li+)) | Specific Surface Area (m²/g) | Initial Charge/Discharge Efficiency (%) | Discharge Capacity (mAh/g) |
|---|---|---|---|---|---|---|
| Comp. Ex. 1 | X1 | 0 | 4.3 | 0.67 | 84.5 | 149.0 |
| Ex. 1 | A1 | 0.5 | | 0.67 | 85.0 | 149.4 |
| Ex. 2 | A2 | 1.0 | | 0.63 | 85.6 | 150.8 |
| Comp. Ex. 2 | X2 | 0 | 4.6 | 0.67 | 84.5 | 186.8 |
| Ex. 3 | A3 | 0.5 | | 0.67 | 85.1 | 186.7 |
| Ex. 4 | A4 | 1.0 | | 0.63 | 84.9 | 187.4 |

TABLE 2

| | Cell | Zr Content (Mole %) of Active Material | End-of-Charge Voltage (V(vs. Li/Li+)) | Loss of Discharge Initiating Potential before and after Cycles (mV) | Capacity Retention (%) |
|---|---|---|---|---|---|
| Comp. Ex. 1 | X1 | 0 | 4.3 | 56 | 94.5 |
| Ex. 1 | A1 | 0.5 | | 15 | 97.7 |
| Ex. 2 | A2 | 1.0 | | 14 | 97.1 |
| Comp. Ex. 2 | X2 | 0 | 4.6 | 156 | 89.2 |
| Ex. 3 | A3 | 0.5 | | 55 | 93.1 |
| Ex. 4 | A4 | 1.0 | | 64 | 92.5 |

As evident from Table 2, addition of zirconium improves capacity retention in charge-discharge cycles and restrains a decline of a discharge initiating potential.

Figure 1:
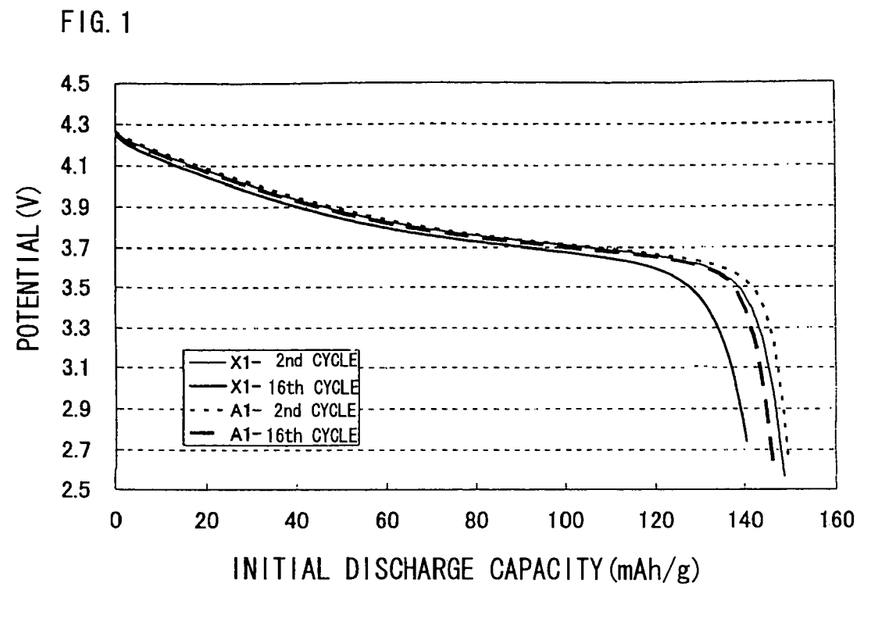
FIG. 1 is a graph showing 2nd-cycle and 16th-cycle charge/discharge curves for the battery A1 of Example 1 and the battery X1 of Comparative Example 1 when charge was terminated at a potential of 4.3 V (vs. $Li/Li^+$).
Figure 2:
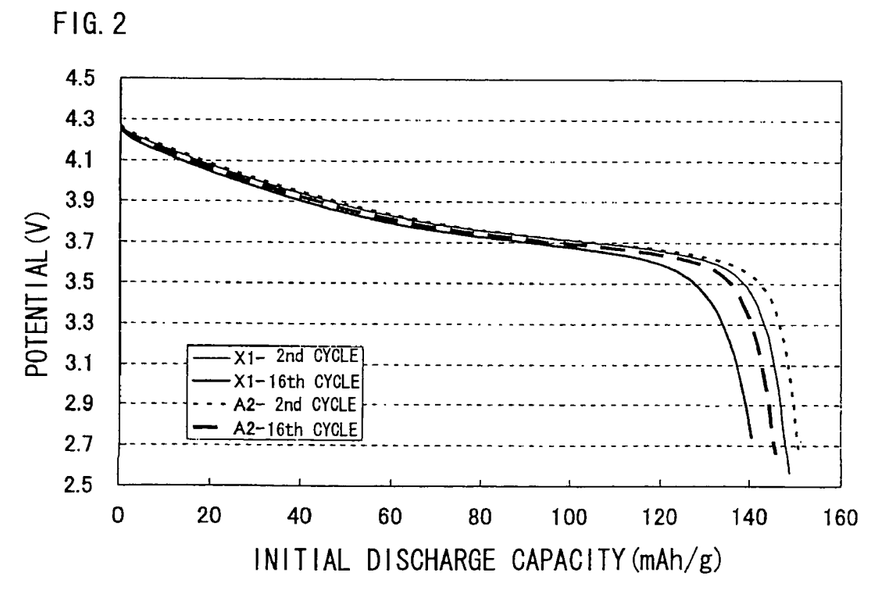
FIG. 2 is a graph showing 2nd-cycle and 16th-cycle charge/discharge curves for the battery A2 of Example 2 and the battery X1 of Comparative Example 1 when charge was terminated at a potential of 4.3 V (vs. $Li/Li^+$).

FIG. 1 shows 2nd-cycle and 16th-cycle charge/discharge curves for the battery A1 of Example 1 and the battery X1 of Comparative Example 1. FIG. 2 shows 2nd-cycle and 16th-cycle charge/discharge curves for the battery A2 of Example 2 and the battery X1 of Comparative Example 1. In FIGS. 1 and 2, the end-of-charge potential is 4.3 V (vs. Li/Li+).

Figure 3:
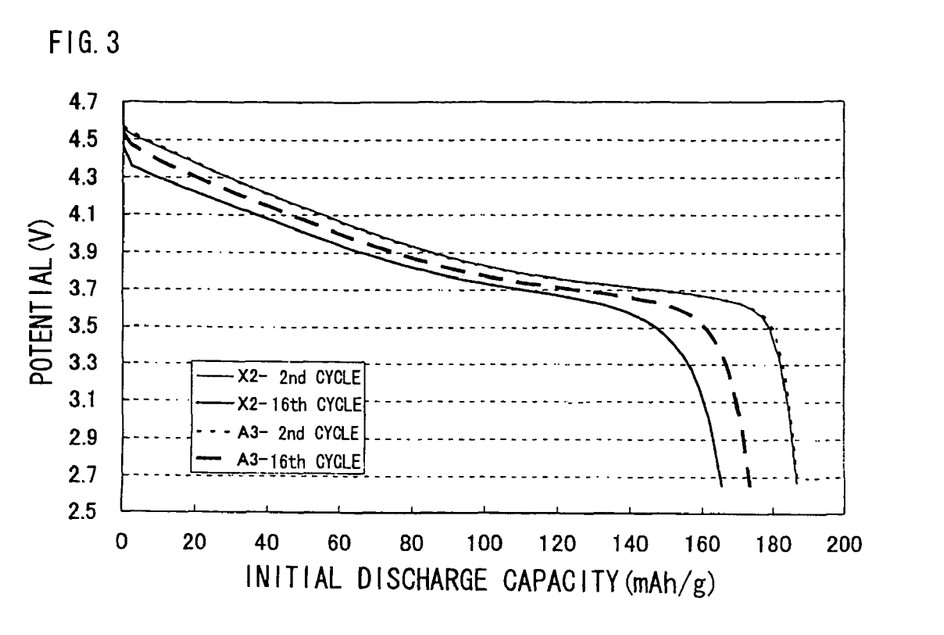
FIG. 3 is a graph showing 2nd-cycle and 16th-cycle charge/discharge curves for the battery A3 of Example 3 and the battery X2 of Comparative Example 2 when charge was terminated at a potential of 4.6 V (vs. $Li/Li^+$).
Figure 4:
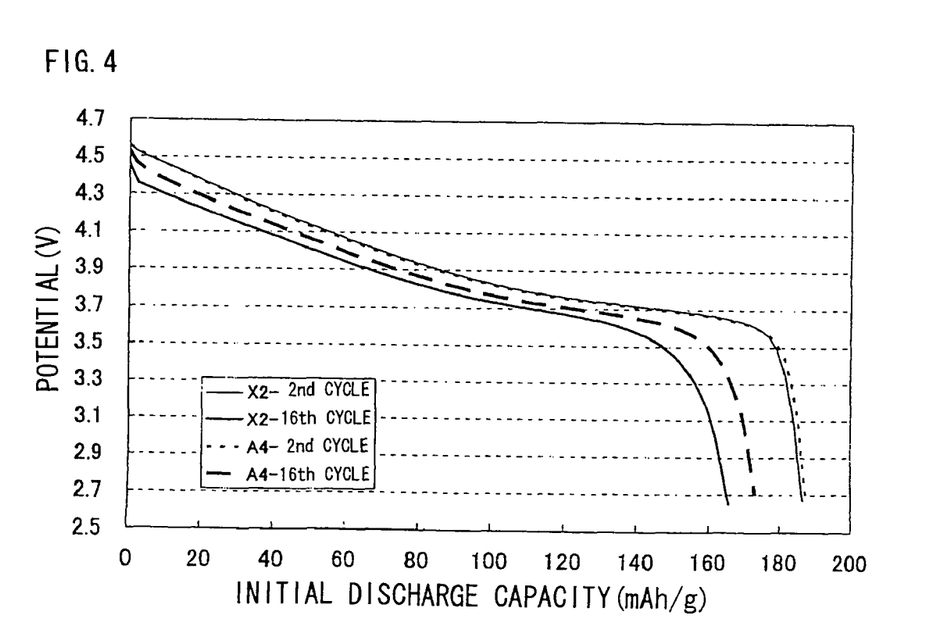
FIG. 4 is a graph showing 2nd-cycle and 16th-cycle charge/discharge curves for the battery A4 of Example 4 and the battery X2 of Comparative Example 2 when charge was terminated at a potential of 4.6 V (vs. $Li/Li^+$).

FIG. 3 shows 2nd-cycle and 16th-cycle charge/discharge curves for the battery A3 of Example 3 and the battery X2 of Comparative Example 2. FIG. 4 shows 2nd-cycle and 16th-cycle charge/discharge curves for the battery A4 of Example 4 and the battery X2 of Comparative Example 2. In FIGS. 3 and 4, the end-of-charge potential is 4.6 V (vs. Li/Li+).

As can be appreciated from comparison between FIGS. 1 and 3 and between FIGS. 2 and 4, the end-of-charge potential of 4.6 V (vs. Li/Li+) is more effective to improve charge-discharge cycle characteristics. This is also evident from Table 2.

EXPERIMENT 2

Example 5

[Fabrication of Positive Electrode]

The positive active material prepared in Example 2, carbon as an electrical conductor and polyvinylidene fluoride as a binder at a ratio by weight of 90:5:5 were added to N-methyl-2-pyrrolidone as a dispersing medium. The mixture was kneaded to prepare a cathode mix slurry. The prepared slurry was coated on an aluminum foil as a current collector, dried and then rolled by a pressure roll. Subsequent attachment of a current collecting tab completed fabrication of a positive electrode.

[Fabrication of Negative Electrode]

Synthetic graphite as the negative active material and a styrene-butadiene rubber as a binder were added to an aqueous solution of carboxymethylcellulose as a thickener so that the mixture contained the active material, binder and thickener in the ratio by weight of 95:3:2. The mixture was then kneaded to prepare an anode mix slurry. The prepared slurry was coated onto a copper foil as a current collector, dried and rolled by a pressure roll. Subsequent attachment of a current collecting tab completed fabrication of a negative electrode.

[Preparation of Electrolyte Solution]

Ethylene carbonate (EC) and ethyl methyl carbonate (EMC) were mixed at a 3:7 ratio by volume to provide a solvent in which lithium hexafluorophosphate ($LiPF_6$) was subsequently dissolved in the concentration of 1 mole/liter to prepare an electrolyte solution.

[Construction of Battery]

The above-obtained positive and negative electrodes were wound, while interposing a separator between them, to provide a wound assembly. In a glove box maintained under Ar atmosphere, the wound assembly and electrolyte solution were encapsulated in a casing of an aluminum laminate to obtain a nonaqueous electrolyte secondary battery A5 having a battery standard size of 3.6 mm in thickness, 3.5 cm in width and 6.2 cm in length. The ratio in charge capacity of the negative to positive electrode in their portions opposed to each other was 1.15.

Comparative Example 3

The procedure of Example 5 was followed, except that the positive active material in Comparative Example 1 was used, to construct a battery X3 and evaluate its characteristics.

[Evaluation of Initial Charge-Discharge Characteristics of Battery]

The constructed nonaqueous electrolyte secondary battery at room temperature was charged at a constant current of 650 mA (about 1 C) to a voltage value of 4.5 V, further charged at a constant voltage of 4.5 V to a current value of 32 mA (about 0.05 C) and then discharged at a constant current of 650 mA to a voltage value of 2.75V to thereby measure its discharge capacity (mAh).

[Evaluation of Charge-Discharge Cycle Characteristics]

After evaluation of the initial charge-discharge cycle characteristics, the battery was subjected to a charge-discharge cycle test under the same conditions to determine its capacity retention and change in discharge initiating voltage on the 50th-cycle. The results are shown in Table 3. The capacity retention was calculated from the following equation.

Capacity retention (%)=(50th-cycle discharge capacity)÷(1st-cycle discharge capacity)×100

TABLE 3

| | Cell | Charge Voltage (V) | Zr Content (Mole %) of Active Material | Initial Discharge Capacity (mAh) | Initial Charge/ Discharge Efficiency (%) | Capacity Retention (%) after 50 Cycles | Loss of Discharge Initiating Potential before and after Cycles (mV) |
|---|---|---|---|---|---|---|---|
| Ex. 5 | A5 | 4.5 | 1.0 | 642.7 | 82.1 | 92.2 | 67 |
| Ex. 3 | X3 | 4.5 | 0 | 629.7 | 83.0 | 91.3 | 95 |

As evident from Table 3, the zirconium-incorporated battery A5 of Example 5 in accordance with the present invention shows the improved capacity retention after 50 cycles and the reduced a decline of discharge initiating voltage after cycles, compared to the zirconium-excluded battery X3 of Comparative Example 3.

EXPERIMENT 3

The following experiment was conducted to investigate the cause of the decline of discharge voltage and discharge capacity when a lithium transition metal complex oxide is subjected to charge-discharge cycles and also investigate the action/effect of incorporating zirconium.

Figure 5:
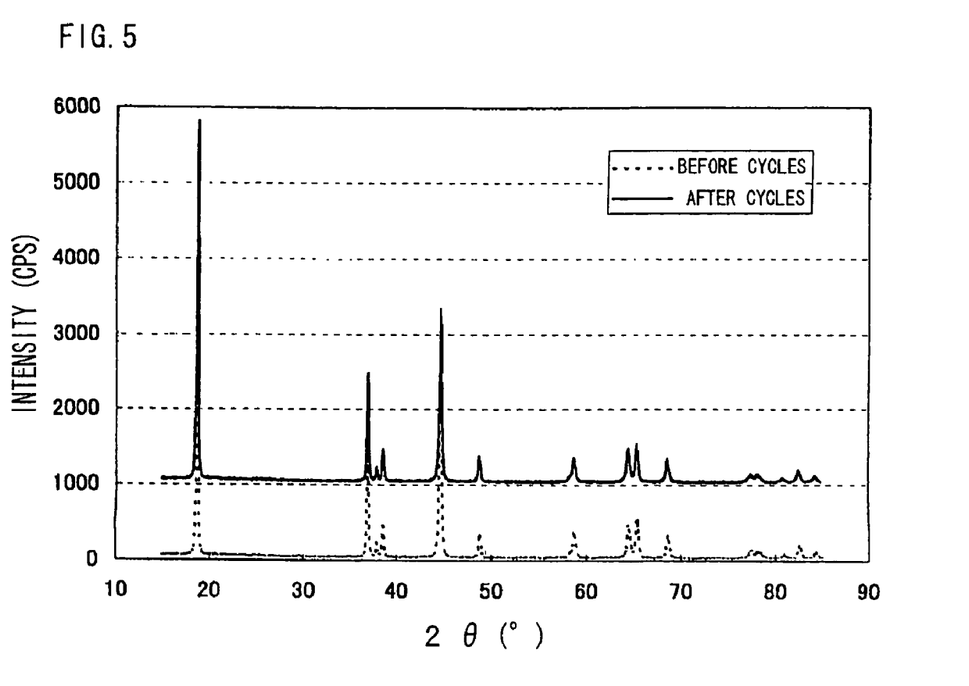
FIG. 5 is a chart showing X-ray diffraction pattern of the positive active material of the battery X3 of Comparative Example 3 before and after the charge-discharge cycle test.

(1) Measurement of XRD pattern of Positive Active Material Before and After Charge-Discharge Cycles The positive electrode was removed from the battery X3 of Comparative Example 3 before and after charge-discharge cycles and its X-ray diffraction (XRD) pattern was measured using CuKα radiation as the source. The results are shown in FIG. 5. The half width was also calculated using a lattice constant and a Gauss method. The results are shown in Table 4.

TABLE 4

| | Battery | Charge-Discharge Cycles | Half-Width (deg) | | |
|---|---|---|---|---|---|
| | | | (003) Plane | (104) Plane | (110) Plane |
| Comp. Ex. 3 | X3 | before Cycles | 0.1423 | 0.2244 | 0.2555 |
| | X3 | after Cycles | 0.1539 | 0.2444 | 0.3006 |

As can be clearly seen from FIG. 5, a difference between X-ray diffraction patterns of the positive active material of the battery before and after charge-discharge cycles is not appreciable. As can also be clearly seen from Table 4, there is no appreciable difference in half width of the positive active material of the battery before and after charge-discharge cycles. These are believed to suggest that no degradation has occurred in a crystal structure of the positive active material of the battery after cycles.

(2) Measurement of Amount of Manganese Precipitated on Negative Electrode of Battery After Cycles After charge-discharge cycles, each of the battery A5 of Example 5 and the battery X3 of Comparative Example 3 was disassembled to collect its negative electrode. Then, the amount of manganese precipitated on a surface of the negative electrode was measured by fluorescent X-ray analysis using rhodium radiation as the source. A range of detection is 0-40 keV. The results are shown in Table 5.

TABLE 5

| | Zr Content (Mole %) of Active Material | Amount of Mn Precipitated on Negative Electrode (cps/μA) |
|---|---|---|
| Ex. 5 | 1.0 | 1.901 |
| Comp. Ex. 3 | 0 | 2.262 |

As evident from Table 5, the amount of manganese precipitated on a surface of the negative electrode of the zirconium-incorporated battery A5 of Example 5 is more than 10% smaller than that of the zirconium-excluded battery X3 of Comparative Example 3.

It is believed from the forgoing that the declining discharge voltage and discharge capacity of the battery having a lithium transition metal complex oxide with charge-discharge cycling is not due to the degradation of crystal structure of the positive active material when subjected to charge-discharge cycles but due to the elution of manganese from the positive active material when subjected to charge-discharge cycles and the resulting resistance build-up at the interface between the positive electrode and the electrolyte solution. The use of the positive active material comprising a lithium transition metal complex oxide containing zirconium, in accordance with the present invention, is believed to retard elution of manganese from the positive active material and restrain declining of discharge voltage and discharge capacity with charge-discharge cycling.

The invention claimed is:

1. A nonaqueous electrolyte secondary battery which has a positive electrode containing a positive active material, a negative electrode containing a negative active material and a nonaqueous electrolyte solution, said secondary battery being characterized in that said positive active material comprises a lithium transition metal complex oxide represented by a chemical formula: $Li_aMn_xNi_yCo_zO_2$ (a, x, y and z satisfy $0 \leq a \leq 1.2$, $x+y+z=1$, $0<x \leq 0.5$, $0<y \leq 0.5$ and $z \geq 0$), and further comprises zirconium in the amount by mole of from 0.1% to 1%, based on the total amount of said transition metals.

2. The nonaqueous electrolyte secondary battery as recited in claim 1, characterized in that said positive electrode in a fully charged state has a potential of at least 4.5 V (vs. $Li/Li^+$).

3. A nonaqueous electrolyte secondary battery which has a positive electrode containing a positive active material, a negative electrode containing a graphite material as a negative active material and a nonaqueous electrolyte and which is designed to be charged with an end-of-charge voltage of at least 4.4 V, said secondary battery being characterized in that said positive active material comprises a lithium transition metal complex oxide represented by a chemical formula: $Li_aMn_xNi_yCo_zO_2$ (a, x, y and z satisfy $0 \leq a \leq 1.2$, $x+y+z=1$, $0<x \leq 0.5$, $0<y \leq 0.5$ and $z \geq 0$), and further comprises zirconium in the amount by mole of from 0.1% to 1%, based on the total amount of said transition metals.

4. The nonaqueous electrolyte secondary battery as recited in claim 1, characterized in that a ratio in capacity of said negative electrode to said positive electrode (negative electrode/positive electrode) in their portions opposed to each other is in the range of 1.0-1.3.

5. The nonaqueous electrolyte secondary battery as recited in claim 1, characterized in that said lithium transition metal complex oxide contains substantially the same amount of Ni and Mn.

6. The nonaqueous electrolyte secondary battery as recited in claim 1, characterized in that said positive active material has a specific surface area of 0.1-2.0 $m^2/g$.

7. The nonaqueous electrolyte secondary battery as recited in claim 3, characterized in that a ratio in capacity of said negative electrode to said positive electrode (negative electrode/positive electrode) in their portions opposed to each other is in the range of 1.0-1.3.

8. The nonaqueous electrolyte secondary battery as recited in claim 3, characterized in that said lithium transition metal complex oxide contains substantially the same amount of Ni and Mn.

9. The nonaqueous electrolyte secondary battery as recited in claim 3, characterized in that said positive active material has a specific surface area of 0.1-2.0 $m^2/g$.

* * * * *